UNITED STATES PATENT OFFICE.

KARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCTION OF BARIUM CYANID.

No. 879,030.      Specification of Letters Patent.      Patented Feb. 11, 1908.

Application filed January 4, 1907. Serial No. 350,845.

*To all whom it may concern:*

Be it known that we, KARL BOSCH and ALWIN MITTASCH, doctors of philosophy and chemists, subjects, respectively, of the King of Prussia and the King of Saxony, residing at Ludwigshafen-on-the-Rhine, Germany, have invented new and useful Improvements in the Production of Barium Cyanid, of which the following is a specification.

Although Margueritte and Sourdeval's process for the production of barium cyanid by heating together carbonaceous material and barium oxid, or barium carbonate, in the presence of nitrogen gas, was discovered in the year 1860 it has not hitherto been capable of being carried out on a commercial scale owing to the small yield of barium cyanid obtained. Experiments have shown that high temperatures are advisable, during the reaction, in order to cause as much nitrogen as possible to enter into combination, but the quantity of cyanid formed is not in proportion to the quantity of nitrogen combined, because at high temperatures the barium cyanid tends to split up into barium cyanamid and carbon according to the equation $Ba(CN)_2 = BaCN_2 + C$, and we have discovered that this splitting up increases as the temperature increases, while at lower temperatures the reverse action takes place, barium cyanamid combining with carbon and forming barium cyanid. It would therefore naturally be expected that, during cooling down from the high temperatures employed, the barium cyanamid present would combine with the carbon which separated out at those high temperatures and that the cold product would consist of barium cyanid with little, or no, barium cyanamid. This, however, is not the case, for the cold product contains a considerable quantity of barium cyanamid, and we believe that this is due to the carbon which separates out from the barium cyanid at high temperatures, separating in, or being subsequently converted into, a form (for instance the form of graphite) unsuitable for being taken up again by the barium cyanamid during cooling. We have discovered that if, during cooling, a gas containing carbon such for instance as acetylene, benzene vapor, or generator gas which has been freed from carbon dioxid be led over a mixture containing barium cyanamid, the barium cyanamid takes up carbon and is converted into barium cyanid. Carbon dioxid is not suited for use in carrying out this invention. The reaction can also be carried out by heating a mixture containing barium cyanamid up to, and maintaining it at, a comparatively low temperature, while passing the gases containing carbon over the said mixture. Temperatures below 1200° C. are suitable for use in carrying out the process of our invention.

The following examples will serve to illustrate how our invention can be carried out, but it is not confined to these examples.

Example 1. Heat, in an iron vessel, at a temperature of from six hundred (600), to eight hundred (800), degrees centigrade, raw barium cyanid mixture in which, for instance, sixty (60) per cent. of the nitrogen contained therein is in the form of cyanid and the rest is in the form of cyanamid, and lead current of acetylene gas over the mixture thus heated. The conversion of the cyanamid into cyanid is finished in a few hours.

Example 2. Make a mixture of three (3) parts by weight of barium carbonate and one (1) part by weight of charcoal into briquets and heat these in a chamotte vessel at a temperature of about fifteen hundred (1500) degrees centigrade, while passing a current of nitrogen through the vessel. As soon as no more nitrogen is being absorbed, allow the temperature to sink to about eleven hundred (1100) degrees centigrade and then, while still further cooling, pass generator gas, which has been freed from carbon dioxid, through the vessel until the conversion of the cyanamid into cyanid is complete.

Now what we claim is:

1. The conversion of barium cyanamid into barium cyanid by heating the barium cyanamid at a temperature below 1200° C. in the presence of a hereinbefore defined gas containing carbon.

2. The production of barium cyanid by heating to a comparatively high temperature in the presence of nitrogen a mixture containing barium carbonate, and carbonaceous material and then treating the resulting product while it is cooling with a hereinbefore defined gas containing carbon, substantially as described.

In testimony whereof we have hereunto set our hands in the presence of two subscribing witnesses.

KARL BOSCH.
ALWIN MITTASCH.

Witnesses:
ERNEST F. EHRHARDT,
T. ALEC. LLOYD.